Figure 7:
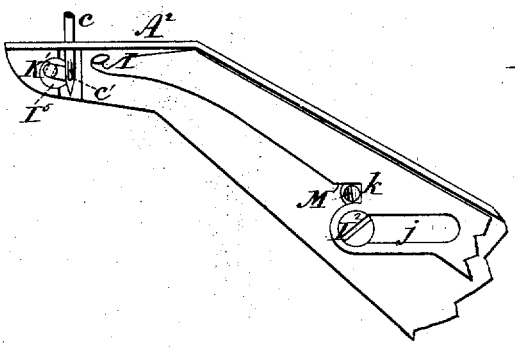

3 Sheets—Sheet 1.
E. DRAKE.
SEWING-MACHINE.
No. 7,154. Reissued June 6, 1876.
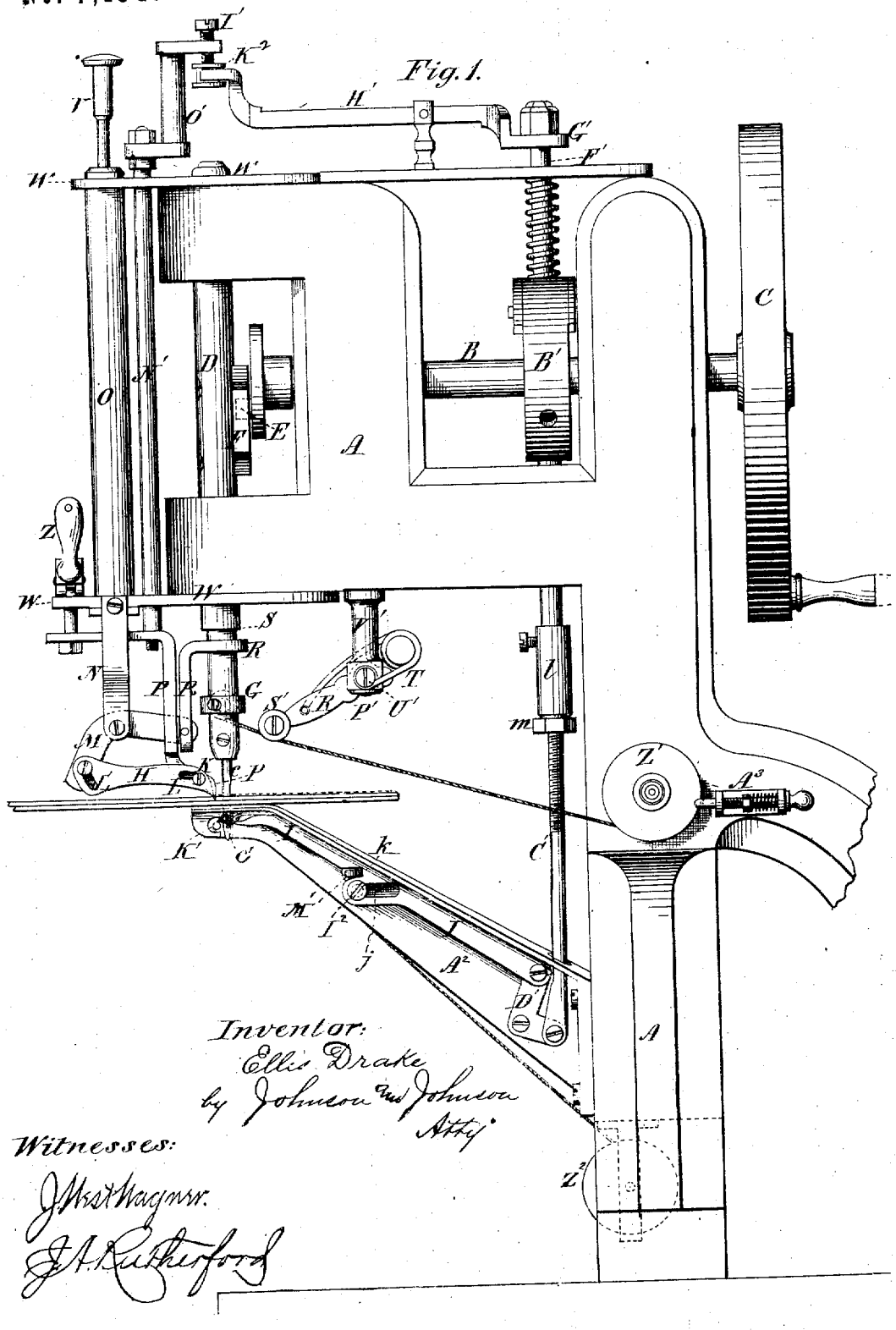
THE NORRIS PETERS CO., WASHINGTON, D. C.

E. DRAKE.
SEWING-MACHINE.
No. 7,154. Reissued June 6, 1876.
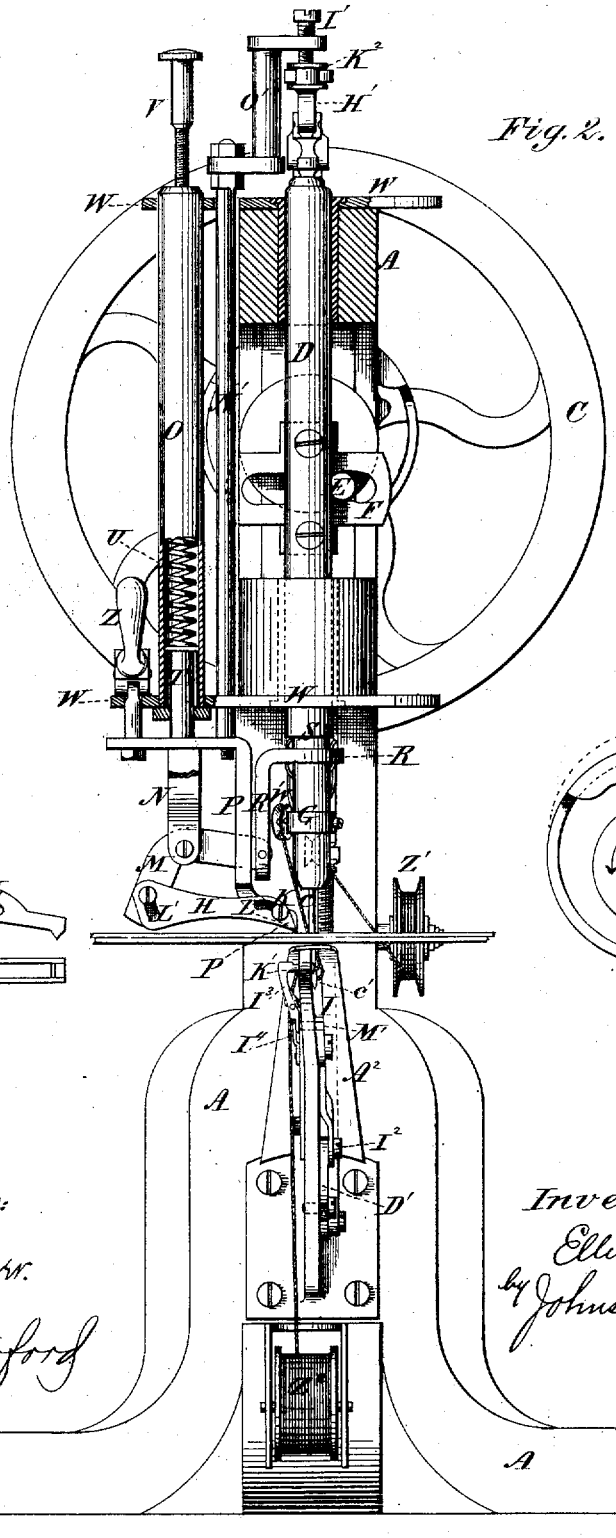
Witnesses:
J. Wm. Wagner
J. A. Rutherford
Inventor:
Ellis Drake
by Johnson & Johnson
Attys
NORRIS PETERS CO., WASHINGTON

E. DRAKE.

SEWING-MACHINE.

No. 7,154. Reissued June 6, 1876.

Witnesses:

J. West Wagner.

J. A. Rutherford

Inventor:

Ellis Drake by Johnson and Johnson

Attys.

THE NORRIS PETERS CO., WASHINGTON, D. C.

UNITED STATES PATENT OFFICE.

ELLIS DRAKE, OF STOUGHTON, MASSACHUSETTS, ASSIGNOR, BY MESNE ASSIGNMENTS, TO THE DRAKE SEWING MACHINE COMPANY.

IMPROVEMENT IN SEWING-MACHINES.

Specification forming part of Letters Patent No. 155,932, dated October 13, 1874; reissue No. 7,154, date June 6, 1876; application filed May 17, 1876.

DIVISION A.

*To all whom it may concern:*

Be it known that I, ELLIS DRAKE, of Stoughton, in the county of Norfolk and State of Massachusetts, have invented certain new and useful Improvements in Sewing-Machines, of which the following is a specification:

My invention relates to a sewing-machine for forming a new and improved stitch which I have invented, said machine and stitch being especially designed for sewing leather and other heavy work, being particularly adapted to harness-making, shoe-making, and the like.

My invention consists in various new and improved combinations and arrangements of devices for producing said improved stitch.

In the construction of this machine I employ an eye-pointed needle, in connection with a work-supporting arm adapted to enter any portion of the interior of a boot or shoe. A reciprocating looper for the under or stitch thread co-operates with a guide for said thread, so that a loop of the under or stitch thread will be passed through a loop of the needle-thread, and in which the looper and the guide are independently carried by the work-supporting arm.

In the operation of these parts the under thread forms the stitch-loop, while the needle-thread serves as the carrier for said loop. In this combination the employment of an eye-pointed needle enables me to use two threads with a work-supporting arm adapted to enter the interior of a boot or shoe.

In the combination with the eye-pointed needle, the looper, thread-guide, work-supporting arm, and presser-foot, I employ a swiveling feed device, mounted upon pivoted arms, the object of which is to enable me to sew any portion of the interior of a boot or shoe by the employment of two threads, from one of which only the stitch-loop is formed. In the formation of this stitch-loop, it is necessary that it should be automatically regulated in length to correspond with the thickness of the work; and this I accomplish by a new combination of mechanism, in connection with the feed device, presser-foot, and looper, whereby the thickness of the work determines the length of the stitch-loop. In effecting this object I make the connection of the feed device and presser-foot with the looper-connections at a point coincident with the axis of the needle-bar, whereby the vertical movement of the presser-foot accurately determines, through the functions of a double cam, arranged between the presser-foot and the looper, the backward movement of the looper, and consequently the proper length of the stitch-loop, while at the same time this axial connection allows the presser-foot and feed device to be swiveled in accordance with the required direction of the work—such as sewing round the toe and heel of a shoe. Connected with this automatic adjustment I combine an independent adjustment to adapt the machine to the various classes of work for which the stitch is applicable.

In some classes of work it is desirable to conceal the ends of the stitch-loops, that the face of the stitches may give the appearance of hand-sewed work, while in other classes of work, where the face of the stitch is not exposed to view in wear, and where greater strength is required, the ends of the stitch-loops may project beyond the surface of the work, which are subsequently riveted in the operation of rubbing down the seam formed thereby.

The independent adjustment referred to is to conform the length of the loop to these conditions; and when once this adjustment is made, the lengths of the loops are determined automatically, the same as if they were equal in length to the thickness of the stock.

The feed-points are provided with double slots, and so connected with the presser-foot and the needle-bar that a downward and forward motion will be given them at the same time to feed the work.

The connection of the looper and presser-foot with the double cam is made by a yoke, through which the said double cam imparts the proper movement to the looper. These movements are peculiar in order to form and give the stitch-loop the right length and cast it off.

The looper and thread-guide are arranged to operate on opposite sides of the work-supporting arm, and both these devices are somewhat peculiar in construction, to adapt them for joint operation with an eye-pointed needle and the small end of the work-supporting arm.

A marker or creaser and feed-point are combined in a single device, for use in place of the feed-points, and in connection with the presser-foot, feed-arm, and needle-bar, so that the movement of the needle-bar operates the creaser and the feed-point, which is formed thereby.

In uniting the uppers to the soles of boots and shoes two threads have been employed on what is known as "turned work," with a "lock-stitch," by the employment of a shuttle, while a single thread has been used in connection with a barbed needle to form what is known as the "chain-stitch." But the employment of two threads for forming a stitch which passes directly from the exterior to the interior of a boot or shoe, on its bottom, has not hitherto been done in sewing-machines, to my knowledge, and this is the distinguishing feature of my invention, in connection with the peculiar stitch formed by my machine.

Figure 5:
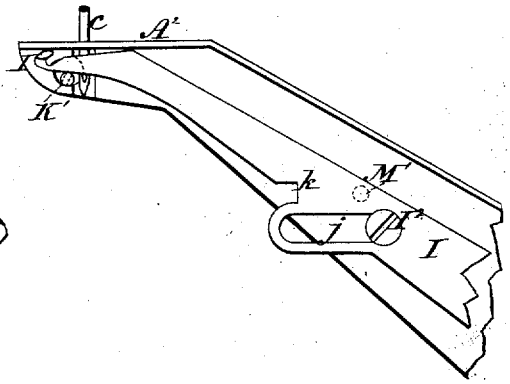
Figure 8:
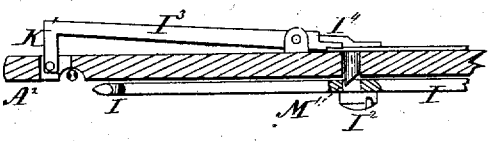
Figure 6:
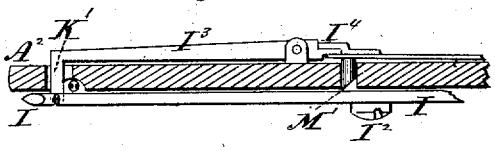
Figure 9:
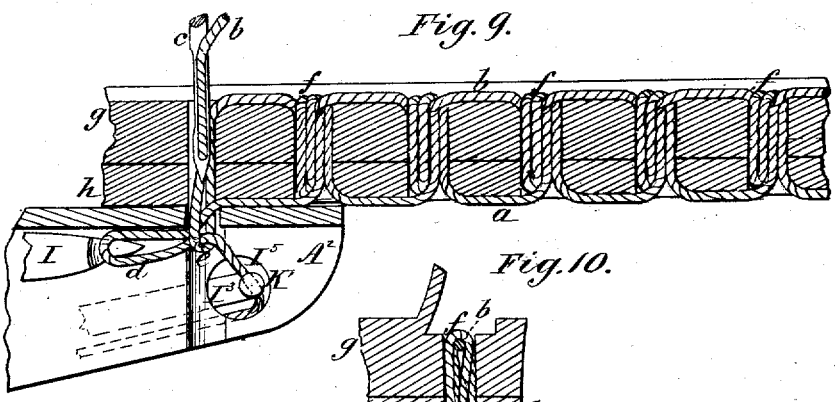
Figure 10:
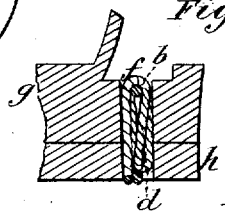

In the accompanying drawings, Figure 1 represents a side elevation of my improved sewing-machine, adapted for forming my new stitch; Fig. 2, a front elevation of the same; Fig. 3, a detached view of the double cam or eccentric, in connection with the yoke of the looper-rod; Fig. 4, a detached view of the marker or creaser and feed-point, for marking between and raising the stitches while feeding the work, when used in the place of the feed device shown in Fig. 1; Fig. 5, a detail side view of the work-supporting arm, showing the looper projected; Fig. 6, a horizontal section of the same, showing the thread-guide projected and the looper in position to take the thread therefrom; Fig. 7, a similar view to Fig. 6, with the looper retracted in position to advance and form the stitch-loop; Fig. 8, a horizontal section of the same, showing the thread-guide retracted; Fig. 9, a sectional view, showing the formation of the stitch in uniting the work; Fig. 10, a cross-section thereof through one of the stitches; and Fig. 11, a portion of the bottom of a boot or shoe sole, showing the appearance of the stitch in the channel.

A represents the frame of the machine, and which supports the various working parts of the same, and B the driving-shaft, provided with a fly-wheel, C, and from which shaft the proper motion is transmitted to the various parts, as will be hereinafter explained.

D represents a reciprocating needle-bar, mounted in guides in the head of the machine, and operated by a pin or cam, E, upon the end of the driving-shaft, working in a slotted cross-plate, F, secured to the needle-bar. Upon the lower portion of the needle-bar is secured a collar, G, which may be adjusted vertically thereon, the object of which is to operate and regulate the feed device, in connection with a shoulder, S, on the needle-bar above the collar.

The said feed device consists of two feed-points, H, secured near their front ends to the presser-foot P, by means of bolts K passing through slots L L′ in the feed-points, and connected at their outer ends to the lower end of a curved feed-arm, M, in a similar manner, so that the action of the two slots will allow the said points to work freely thereon, and rise and fall at proper times during their backward and forward motions.

The feed-arm M is pivoted between the ends of the supporting-arms N N, which are attached to a plate, W, pivoted to and projecting from the lower needle-bar bearing. Said feed-arm is in form of a bent lever, as shown, and passes through the presser-foot arm, and to its upper end is pivoted a clutch or coupling, R, whose upper end embraces the needle-bar above the collar G, and by which the said feed-arm is operated to make the feed on the upward stroke of the needle-bar, while the shoulder S, on said bar, acts upon the clutch or coupling R upon the descent of the needle-bar, to retract the feed-points, thus giving the proper reciprocating motion to said device, and raising the points by means of their slotted connections, during their backward movement over the work—the separate slots for this purpose being arranged the front one, L, nearly horizontally, and the outer one, L′, nearly vertical, as will be readily understood from the drawing.

The presser-foot P is attached to and carried by a rod, N′, which moves vertically in guide-plates W W, pivoted to and extending out from the upper and lower bearings of the needle-bar, while a stem, T, rising from the upper end of the presser-foot arm, serves as a bearing for a spring, U, secured in a vertical tube O, to give the presser-foot and feed-points the proper downward pressure upon the work, as shown, and the degree of its pressure upon the work is regulated by an adjusting-screw, V, which bears upon the spring so as to suit the nature of the work.

The vertical rod N′ operates with the feed device, and, together with the presser-foot and the tube confining its pressure-spring, is secured to and carried by the pivoted plate W W of the needle-bar bearings, so that the feed-device and presser-foot can be given a half-revolution around said needle-bar, and independent of the same.

The feed-points H are so attached and operated upon the presser-foot that, by the downward and forward motion given by their slots, they descend below the work-bearing surface of the presser-foot, and, at the same time, rise and separate the presser-foot from the work by the compression of the presser-foot spring, whereby the work is carried along the face of the supporting-arm by the feed-points, to correspond with their horizontal motion, transferring at the same time the pressure of the presser-foot spring to that of the feed points, thus obtaining an equal amount of pressure upon the work at all times during the process of sewing, and avoiding a separate device for raising the presser-foot at the instant of feeding the work to form the required space between the stitches.

The needle *c* has an eye, *c'*, for carrying the upper thread, and, in combination with a work-supporting arm, $A^2$, which enters within the boot or shoe, and carries the stitch-thread and the swiveling action of the feed device, I am enabled to employ two threads in uniting the soles and uppers of boots and shoes, by passing the stitch from the outside to the inside of the work, and reach any part of the work. This advantage results from the use of the eye-pointed needle-looper, thread-guide, and work-supporting arm in the formation of my improved stitch-loop.

Z is the lifter by which the presser-foot and the feed device can be lifted from the work. The "throw" of the feed-points, which determines the length of the stitch, is adjusted by means of the collar G on the needle-bar by raising or lowering said collar.

$A^1$ represents a double cam, secured on the cam-shaft B, and which works within a yoke, $B^1$, secured to a rod, C', passing downward through the frame, and connected at its lower end to a bell-crank lever, D', which is connected with and transmits motion to the looper and thread-guide, as will be presently described.

The said yoke $B^1$ has a friction-roll, E', Fig. 3, which rests upon and is operated by the double cam $A^1$, giving a vertical reciprocating motion to the yoke, and operating the looper through the crank-connection. To the upper side of this yoke is attached a short rod, F', which passes upward through a guide-plate and connects with a forked end, G', of a lever, H', pivoted to the top of the machine. Said rod F' is surrounded with a spiral spring, which presses upon the yoke and gives its rod C' its downward movement after it has been raised by the double cam. The lever H' is also connected at its front end to the presser-foot rod N' by the swiveling connection $K^2$, and this point of connection must be in the line of the axis of the needle-bar, as shown, to produce the proper movement of the looper, and admit at the same time the swiveling motion to the feed device and presser-foot.

The bell-crank lever D' is connected to and operates the looper I, giving it a forward and backward reciprocating motion as the yoke $B^1$ rises and falls.

It will be perceived that the double cam $A^1$ gives four motions for each stitch in succession to the yoke and looper-rod, and these movements are transmitted to the looper. The first of these movements takes place just as the needle begins to return through the work, and causes the looper point or hook to advance through the loop of the upper thread and seize the lower thread from the guide $K^1$, and then recede, bringing a loop of the lower thread through the loop of the upper thread, and holding it in this position until the needle is just about to leave the work, when a similar forward movement of the looper takes place, the looper advancing only until its point comes directly under the hole in the work supporting arm, through which the needle passes, which releases the loop, and allows it to be drawn up into the work, and while the needle is again returning to form another stitch a backward motion is given to the looper to prevent its point from intercepting the loop of the upper thread, while being formed by the receding of the needle.

The looper I is carried by and lies along the side of the upwardly-inclined work-supporting arm $A^2$, and is held in position by a screw, $I^2$, which passes through a horizontal slot, *j*, by which, notwithstanding the inclined position of the looper, it has a horizontal movement, its looping end being made horizontal to correspond with the horizontal end of the work-supporting arm, so that said arm carries a looper for the lower thread for operation with the needle-thread. The thread-guide $K^1$ is also carried by the work-supporting arm, and is arranged on the side thereof, opposite to the looper. It consists of an arm, $I^3$, pivoted to the side of the work-support, and connected to a spring, $I^4$, the normal position of which is to maintain the thread-guide in its retracted position.

The front end of this arm $I^3$ is bent at right angles, and has an eye, and passes through an opening, $I^5$, in the work-support, directly below and in front of the needle-passage, and carries the under thread. Near the pivoted end of the thread-guide, and projecting from the spring, is a stud, M', extending through an aperture in the work-support, and coming directly opposite a recess, *k*, on the under edge of the looper. The said stud is made to operate the thread-guide, and cause its eyed end to approach and meet the looper as it moves forward, so that it can receive the thread and recede again after the loop is taken. The first movement is caused by the looper passing over said stud, and the second by means of a suitable spring, to throw the thread-carrier back.

In this movement of the thread-guide the looper acts as a cam upon the stud M', so that both the looper and the thread-guide are upon opposite sides of the supporting-arm $A^2$, and they are both operated from the bell-crank connection with the double cam, and directly within the boot or shoe while sewing with two threads. The stitch-loops are formed of lengths corresponding to the thickness of the work operated upon, by means of devices operating automatically in combination with the presser-foot, and the devices for operating the looper, and this result is governed by the height of the presser-foot from the surface of the work-support. These devices consist of the lever H′, connected at one end with the presser-foot rod N′ in the line of the axis of the needle-bar, and at the other end with the looper I, through the yoke and rod $B^1$ C′ and the bell-crank, thus completing the circuit of these devices and operating them by the double cam, the adjustment of the lever H′ by the screw $I^1$ serving to bring the friction-roll E′, Fig. 3, nearer to or farther from the acting points of the double cam, and thus give the desired movement to the looper, the thickness of the work serving as the gage for the length of the loop, by means of the presser-foot resting thereon, and when once the proper adjustment is made, the operation to conform to the varying thicknesses of the work—such as the ball and shank of the shoe—is automatic. The adjustment of the lever H′ to depress its cam-connected end will make the loops longer, while the elevation of such end of the lever will make the loops shorter, and correspondingly must be the backward movement of the looper, there being no variation in the forward throw of the looper to take the loop. The connection and co-operation of the devices by which this is determined are of simple construction, and extend from the presser-foot above the stock to the looper below the stock, and in connection with a loop formed by a needle-thread from above and an under thread from below the work. The vertical guide-rod N′ of the presser foot carries on its upper end a cranked coupling, O′, the upper crank portion of which extends over the end of the lever H′, which connects with the double-cam yoke. Through this crank-coupling extends downward an adjusting-screw, $I^1$, carrying on its lower end a flanged collar, $K^2$, which is embraced by the front forked end of the lever H′, whereby I obtain a swiveling connection of the feed-carrying device with the lever, which automatically controls the lengths of the loops by its connection with the operating looper-cam. The looper-rod C′ is made adjustable by means of a screw-sleeve, *l*, and lock-nut union *m*, with the yoke-rod, so that by adjusting the screw-sleeve the looper-hook is made to have its proper relation with the thread-guide and the needle.

The adjustment of the lever H′ serves another important advantage. In different classes of work it is desirable to conceal the ends of the stitch-loops within the work, while in other classes of work it is advantageous to have the loop ends project beyond the surface. In the former class the concealing of the ends of the loops gives the appearance of hand-sewed work; while in the other class greater strength of stitch being required, I am enabled, by the projection of the ends of the loops beyond the surface, to rivet them in the operation of finishing or rubbing down the work. This I effect by adjusting the lever-screw $I^1$ as required, to make the looper have a greater backward movement than the thickness of the stock would give, and thereby give greater length to the stitch-loops, and the desired projection of the ends thereof beyond the surface of the work. The reverse adjustment of these parts gives loops of less length than the thickness of the stock, so as to conceal the ends of the stitch-loops. By this independent adjustment I control the operation of the machine to suit different classes of work.

The cam $A^1$ (shown in Fig. 3) has two separate and distinct acting points, *n o*, Fig. 3, of unequal radius. That portion of the cam *n* farthest from its center is to project the looper-point, to engage with the under thread to form the stitch-loop, while the second or lesser projection *o* of the cam serves to give the looper a quick forward movement for casting off or releasing the loop from its barb; but this action of the cam must not project the looper so that it will engage with the under thread during the upward motion of the needle, but simply casting off the loop to allow the needle to complete the stitch. The portion of the cam between its acting points is concentric with the driving-shaft, and gives no movement to the looper, while the depression between the acting points allows the looper to be forced back by the action of the spring upon the yoke $B^1$, and carry with it the stitch-loop to its proper length.

In passing from the lesser cam-projection to the concentric portion, the looper, having cast off its loop, recedes enough to allow the needle to again form a loop to receive the looper.

P′ represents a device for taking up the needle-thread, and consists of a lever, R′, carrying a grooved roll, S′, at its end, and held in position by an adjusting-spring, T′, which may be set so as to press with more or less force upon the thread, by means of a set-screw, U′, by which the take-up is attached to a hanger, V′, secured to the frame. The needle-thread passes round the roll S′, and round a grooved roll, W′, Fig. 2, on the collar G of the needle-bar, and the take-up pressure is made upon the thread between by the guide-roll S′. The needle-thread is supplied from the spool $Z^1$, which is fitted with a tension device, $A^3$, consisting of a notched spring-pin, so set that its notched end will engage the periphery of the spool, and give the desired pressure or tension thereon.

The thread for the stitch-loop passes through the guide $K^1$ from the spool $Z^2$.

Figure 11:
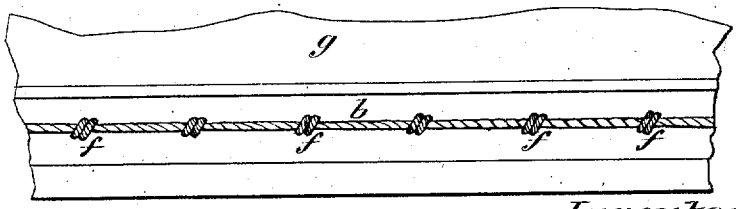

Reference being had to the drawings, Figs. 9, 10, and 11 show the stitch as being formed by the lower thread *a*, the upper or needle thread *b* serving as the carrier for this lower or stitch thread. This is done by first passing the upper thread *b* through the work by means of the eye-pointed needle *c*, and then drawing a loop, *d*, of the under thread *a* through the loop *e* of the upper thread, formed by the recession of the needle. The under-thread loop is then released by the forward movement of the looper, and is drawn up into the work by the return of the needle filling the hole made thereby, and forming two loops or a double loop.

It will be perceived that the stitch thus formed will present but one thread on each surface of the work, giving the appearance of hand-sewed work, while the strands of the stitch in the needle-hole will consist of four threads or strands, and completely and absolutely fill the hole formed by the needle, and will be so packed or crowded therein as to securely and firmly bind the work together. The stitch, however, being embraced in a division of this patent, need not be more specifically described herein.

I claim—

1. The combination, with an eyed needle, carrying an upper thread, and the work-supporting arm $A^2$, of a looper, I, and guide $K^1$, for the under thread, arranged upon said arm, said looper operating to convey from the thread-guide the loop of an under or stitch thread through a loop of the upper or needle thread.

2. The combination, with an eye-pointed needle, work-supporting arm, its looper and thread-guide, of the swiveling feed and presser foot devices for joint operation, as set forth.

3. The thread-guide $K^1$, having the right-angled eyed end, and a cam-pin, $M^1$, and spring-connection at its opposite end, in combination with the looper, having a cam-recess, *k*, and a slot-guide, *j*, said eyed end and cam-pin being arranged to extend laterally through the work-supporting arm, for operation as herein set forth.

4. The arms W, pivoted to the frame, in combination with the presser-foot P, its rod N′, the feed device H M R, the collar G, and shoulder S of the needle-bar, substantially as and for the purpose herein set forth.

5. The combination, with the presser-foot P, coupled for automatic operation with the looper I, as described, of the needle-bar D, said coupling being arranged in line coincident with the axis of the needle-bar, for the purpose described.

6. The combination of the looper, the thread-guide, and the presser-foot, of connecting mechanism, substantially as described, whereby the length of the stitch is automatically determined to suit the thickness of the work, substantially as specified.

7. In combination with the looper connecting and operating devices, and the needle-bar, the couplings O′ R, and the feed and presser foot devices, for the purpose specified.

8. The combination, with the eye-pointed needle, operating through the top of the work-supporting arm, of the thread-guide through the side of said arm, and the looper, along the arm side, to operate, in the manner described, upon flat surface-work.

9. The combination, with the screw-rod C′, the cam-yoke $B^1$, and the looper I, of the screw-sleeve *l* and the lock-nut *m*, whereby the looper-connection is adjusted.

10. The combination of the double cam $A^1$, on the driving-shaft B, with the yoke $B^1$ and its rod C′, connected with and operating the looper, substantially as described.

11. The feed-points H H, secured to the presser-foot by pin K, and provided with double slots, as described, and attached to the feed-arm M, in combination with collar G and shoulder S, by which said feed-points are operated, to have a downward and forward motion at the same time, to move the material upon the work-supporting arm.

12. The combination, with the double-slotted feed point or points, the feed-arm M, pivoted to the frame, as described, and the needle-bar, of the presser-foot P, its guide-pin T, and the presser-spring U, whereby the spring force of the presser-foot is transferred to the feed point or points during the operation of feeding the work, and the use of a separate device for that purpose avoided.

13. The rod N′, which carries the presser-foot, in combination with the lever H′ and rod F′, by means of which the throw of said rod is regulated, for the purpose of controlling the movement of the yoke B, and regulating the length of the loop of the under thread, as herein set forth.

14. The combination of the rod N′, cranked coupling O′, set-screw $I^1$, and lever H′, connected with the rod F′, by means of which the throw of said rod F′ may be adjusted, to give a greater or less length to the loops than the thickness of the stock being sewed, as herein set forth.

15. The yoke $B^1$ and adjustable rod C′, in combination with the crank-arm D′, and looper I, operating together, as herein set forth.

16. The device for taking up the thread, consisting of the lever R′, roll S′, and adjustable spring T′, attached to the hanger V′, the roll acting directly on the thread as the needle rises, all substantially as herein described.

17. The marker or creaser $B^2$ $B^2$, for attachment to the feed-arm M and presser-foot P, as described, and adapted to be operated by the collar G, and shoulder S on the needle-bar, as herein set forth, and for the object specified.

18. The combination, with the presser-foot and the feed-operating mechanism, of a creaser, substantially as described, whereby the work is fed and the spaces between the stitches creased or marked.

19. The combination, with the work-supporting arm, adapted to enter a boot or shoe, and a reciprocating needle, of a mechanism for doubling and quadrupling an under thread, and for drawing said thread quadrupled into the needle-hole by the needle-thread, substantially as described.

In testimony whereof I have affixed my signature in the presence of two witnesses.

ELLIS DRAKE.

Witnesses:

A. E. H. JOHNSON,

J. W. HAMILTON JOHNSON.